United States Patent [19]
Long

[11] Patent Number: 5,754,859
[45] Date of Patent: May 19, 1998

[54] VARIABLE PITCH INDENTATION IN SOURCE CODE FORMATTING

[76] Inventor: Robert Craig Long, 46792 Fairgrove Sq., Sterling, Va. 20164

[21] Appl. No.: 381,124

[22] Filed: Jan. 31, 1995

[51] Int. Cl.⁶ .................................................. G06F 9/45
[52] U.S. Cl. ..................... 395/701; 395/708; 395/118; 395/145
[58] Field of Search ........................ 395/135, 700, 395/139, 148, 701, 708, 118, 145; 364/DIG. 1, DIG. 2

[56] References Cited

U.S. PATENT DOCUMENTS

| | | | |
|---|---|---|---|
| 4,447,888 | 5/1984 | Kuecker et al. | 364/900 |
| 4,862,410 | 8/1989 | Fukunaga | 364/900 |
| 5,307,493 | 4/1994 | Gusenius | 395/700 |

*Primary Examiner*—Kevin A. Kriess
*Assistant Examiner*—Kakali Chaki

[57] ABSTRACT

The process of formatting source code is improved by the use of different nesting pitches for different nesting levels, by the use of different pitches for the same indentation level in different sections of the code, and by the use of one or more maximum indentation amounts. These three improvements enable the formatter to increase the amount of source code that may be presented to a viewer in a given presentation area, such as a computer screen or sheet of paper, while largely maintaining or even improving the visual clarity of the presentation.

17 Claims, 11 Drawing Sheets

```
                 Align at maximum indentation, fixed-pitch indentation.

1  |ProcedureName(int CallingParameter) {      |                                        |
 2  |        if (a) {                           |                                        |
 3  |                aaa();                     | max indent                             |
 4  |                if (b) {                   |                                        |
 5  |                        bbb();             |                                        |
 6  |                        if (c) {                                                    |
 7  |                                ccc();                                              |
 8  |                                if (d) {                                            |
 9  |                                        ddd();                                      |
10  |                                        if (e) {                                    |
11  |                                        eee();                                      |
12  |                                        if (f) {                                    |
13  |                                        fff();                                      |
14  |                                        if (g) {                                    |
15  |                                        ggg();                                      |
16  |                                        if (h) {                                    |
17  |                                        hhh();                                      |
18  |                                        }                                           |
19  |                                        }                                           |
20  |                                        }                                           |
21  |                                        }                                           |
22  |                                }                                                   |
23  |                        }                                                           |
24  |                }                                                                   |
25  |        }                                                                           |
26  |}

|       |       |       |       |       |
     nesting levels shown
     1       2       3       4       5       6,7,8,9,10
     pitches at levels shown (in spaces)
     8       8       8       8       8       0
```

Figure 1.

Fixed-pitch indentation, lines wrapped at right margin.

```
 1  ProcedureName(int CallingParameter) {
 2          if (a) {
 3                  aaa();
 4                  if (b) {
 5                          bbb();
 6                          if (c) {
 7                                  ccc();
 8                                  if (d) {
 9                                          ddd();
10                                          if (e) {
11                                                  eee();
12                                                  if (f) {
13                                                          fff();
14                                                          if (g)
15  {
16
17    ggg()
18
19    if (h) {
20
21          hhh();
22
23    }
24                                                                  }
25                                                          }
26                                                  }
-  -  -  -  -  -  -  -  -  -  -  -  -  -  -  -  -  -  -  -  -  -  -  -  -  -  -  -  -  -
27                                          }
28                                  }                                              extra
29                          }                                                      lines
30                  }
31  }
```

```
    |       |       |       |       |       |       |       |
    nesting levels shown
    1       2       3       4       5       6       7       8
    pitches at levels shown (in spaces)
    8       8       8       8       8       8       8       8
    |       |
    nesting levels shown wrapped
    8       9
    pitches at nesting levels shown wrapped (in spaces)
    8       8
```

Figure 2.

Fixed-pitch indentation, lines clipped at right margin.

```
 1  ProcedureName(int CallingParameter) {
 2          if (a) {
 3                  aaa();
 4                  if (b) {
 5                          bbb();
 6                          if (c) {
 7                                  ccc();
 8                                  if (d) {
 9                                          ddd();
10                                          if (e) {
11                                                  eee();
12                                                  if (f) {
13                                                          fff();
14                                                          if (g)
15
16
17
18
19                                                          }
20                                                  }
21                                          }
22                                  }
23                          }
24                  }
25          }
26  }

|       |      |     |     |     |     |     |
    nesting levels shown
    1       2      3     4     5     6     7     8
    pitches at levels shown (in spaces)
    8       8      8     8     8     8     8     8
```

Figure 3a.

Multiple-pitch indentation, lines not wrapped or clipped.

```
 1  |ProcedureName(int CallingParameter) {
 2  |        if (a) {
 3  |                aaa();
 4  |                if (b) {
 5  |                        bbb();
 6  |                        if (c) {
 7  |                                ccc();
 8  |                                if (d) {
 9  |                                        ddd();
10  |                                        if (e) {
11  |                                                eee();
12  |                                                if (f) {
13  |                                                        fff();
14  |                                                        if (g) {
15  |                                                                ggg();
16  |                                                                if (h) {
17  |                                                                        hhh();
18  |                                                                }
19  |                                                        }
20  |                                                }
21  |                                        }
22  |                                }
23  |                        }
24  |                }
25  |        }
26  |}
```

```
|        |       |       |     |    |    |    |   |   |   |
nesting levels shown
1       2       3       4     5    6    7    8   9   10
pitches at levels shown (in spaces)
8       8       7       7     6    6    5    5   4   4
```

Figure 3b.

Multiple-pitch indentation,
initial nesting pitches specified to be 2, 4, 6,
the rest starting at 8

```
 1  |ProcedureName(int CallingParameter) {
 2  |  if (a) {
 3  |    aaa();
 4  |    if (b) {
 5  |        bbb();
 6  |        if (c) {
 7  |                ccc();
 8  |                if (d) {
 9  |                        ddd();
10  |                        if (e) {
11  |                                eee();
12  |                                if (f) {
13  |                                      fff();
14  |                                      if (g) {
15  |                                            ggg();
16  |                                            if (h) {
17  |                                                  hhh();
18  |                                            }
19  |                                      }
20  |                                }
21  |                        }
22  |                }
23  |        }
24  |    }
25  |  }
26  |}
```

```
| |  |    |      |     |      |     |     |     |
nesting levels shown
1 2  3    4      5      6      7     8     9    10
pitches at levels shown (in spaces)
2 4  6    8      8      7      7     6     6     5
```

Figure 4a.

Align at maximum indentation, fixed-pitch indentation.

```
1  |ProcedureName(int CallingParameter) {    |
2  |        if (a) {
3  |                aaa();                   | max indent
4  |                if (b) {
5  |                        bbb();           |
6  |                        if (c) {
7  |                                ccc();
8  |                                if (d) {
9  |                                        ddd();
10 |                                        if (e) {
11 |                                        eee();
12 |                                        if (f) {
13 |                                        fff();
14 |                                        if (g) {
15 |                                        ggg();
16 |                                        if (h) {
17 |                                        hhh();
18 |                                        }
19 |                                        }
20 |                                        }
21 |                                        }
22 |                                }
23 |                        }
24 |                }
25 |        }
26 |}
```

|       |       |       |     |     |     |
|-------|-------|-------|-----|-----|-----| nesting levels shown
1       2       3       4     5     6,7,8,9,10
pitches at levels shown (in spaces)
8       8       8       8     8     0

Figure 4b.

Align at maximum indentation, multiple-pitch indentation.

```
1  |ProcedureName(int CallingParameter) {     |
2  |        if (a) {
3  |                aaa();                            | max indent
4  |                if (b) {
5  |                        bbb();                    |
6  |                        if (c) {
7  |                                ccc();
8  |                                if (d) {
9  |                                        ddd();
10 |                                        if (e) {
11 |                                           eee();
12 |                                           if (f) {
13 |                                             fff();
14 |                                             if (g) {
15 |                                              ggg();
16 |                                              if (h) {
17 |                                               hhh();
18 |                                              }
19 |                                             }
20 |                                            }
21 |                                          }
22 |                                       }
23 |                                }
24 |                        }
25 |                }
26 |}
```

```
   |        |        |        |      |     |    |||
   nesting levels shown
   1        2        3        4      5     6    7 8910
   pitches at levels shown (in spaces)
   8        7        6        5      4     3    2 111
```

Figure 5.

Zig-zag indentation.

```
1  |ProcedureName(int CallingParameter) {     |
2  |        if (a) {
3  |                aaa();                    | max indent
4  |                if (b) {
5  |                        bbb();            |
6  |                        if (c) {
7  |                                ccc();
8  |                                if (d) {
9  |                                        ddd();
10 |                                        if (e) {
11 |                                eee();
12 |                                if (f) {
13 |                        fff();
14 |                        if (g) {
15 |                                ggg();
16 |                                if (h) {
17 |                                        hhh();
18 |                                }
19 |                        }
20 |                                }
21 |                                        }
22 |                                }
23 |                        }
24 |                }
25 |        }
26 |}
```

|       |       |       |       |       |       |
|-------|-------|-------|-------|-------|-------|
nesting levels shown
1       2       3       4,8     5,7,9   6,10
pitches at levels shown (in spaces)
8       8       8       8       8,-8    -8

Figure 6.

Oscillating indentation, marked.

```
 1  |ProcedureName(int CallingParameter) {    |
 2  |        if (a) {
 3  |                    aaa();                         | max indent
 4  |                    if (b) {
 5  |                            bbb();                 |
 6  |                            if (c) {
 7  |                                    ccc();
 8  |                                    if (d) {
 9  |                                            ddd();
10  |                                            if (e) {
11  |  /*6*/            eee();
12  |  /*6*/            if (f) {
13  |  /*7*/                                    fff();
14  |  /*7*/                                    if (g) {
15  |  /*8*/            ggg();
16  |  /*8*/            if (h) {
17  |  /*9*/                                            hhh();
18  |  /*8*/            }
19  |  /*7*/                                    }
20  |  /*6*/            }
21  |                                            }
22  |                                    }
23  |                            }
24  |                    }
25  |        }
26  |}
```

|          |        |          |       |         |
nesting levels shown
1         2        3,7,9      4       5         6,8,10
pitches at levels shown (in spaces)
8         8        8,24       8       8         -24

Figure 7.

Saw-tooth indentation.

```
1  |ProcedureName(int CallingParameter) {    |
2  |        if (a) {
3  |                aaa();                   | max indent
4  |                if (b) {
5  |                        bbb();           |
6  |                        if (c) {
7  |                                ccc();
8  |                                if (d) {
9  |                                        ddd();
10 |                                        if (e) {
11 |                eee();
12 |                if (f) {
13 |                        fff();
14 |                        if (g) {
15 |                                ggg();
16 |                                if (h) {
17 |                                        hhh();
18 |                                }
19 |                        }
20 |                }
21 |                                        }
22 |                                }
23 |                        }
24 |                }
25 |        }
26 |}
```

|        |        |      |      |      |
   nesting levels shown
   1        2        3,7    4,8    5,9    6,10
   pitches at levels shown (in spaces)
   8        8        8      8      8      -24

Figure 8.

Fixed-pitch indentation with changeable-pitch indentation.

```
1  Procedure1(int CallingParameter) {
2       if (a) {
3           if (b) {
4               if (c) {
5                   if (d) {
6                       if (e) {
7                           eee();
8                       }
9                   }
10              }
11          }
12      }
13  }
14
15  Procedure2(int CallingParameter) {
16      if (a) {
17          if (b) {
18              if (c) {
19                  if (d) {
20                      if (e) {
21                          if (f) {
22                              if (g) {
23                                  if (h) {
24                                      if (i) {
25                                          if (j) {
26                                              if (k) {
27                                                  kkk();
28                                              }
29                                          }
30                                      }
31                                  }
32                              }
33                          }
34                      }
35                  }
36              }
37          }
38      }
39  }
```

Note that regions with the decreased pitches do not necessarily have all pitches the same size.

Figure 9.

Multiple-pitch indentation with changeable-pitch indentation.

```
 1  Procedure1(int CallingParameter) {
 2      if (a) {
 3          if (b) {
 4              if (c) {
 5                  if (d) {
 6                      if (e) {
 7                          if (f) {
 8                              if (g) {
 9                                  ggg();
10                              }
11                          }
12                      }
13                  }
14              }
15          }
16      }
17  }
18  Procedure2(int CallingParameter) {
19      if (a) {
20          if (b) {
21              if (c) {
22                  if (d) {
23                      if (e) {
24                          if (f) {
25                              if (g) {
26                                  if (h) {
27                                      if (i) {
28                                          if (j) {
29                                              if (k) {
30                                                  if (l) {
31                                                      if (m) {
32                                                          if (n) {
33                                                              if (o) {
34                                                                  if (p) {
35                                                                      if (q) {
36                                                                          qqq();
37                                                                      }
38                                                                  }
39                                                              }
40                                                          }
41                                                      }
42                                                  }
43                                              }
44                                          }
45                                      }
46                                  }
47                              }
48                          }
49                      }
50                  }
51              }
52          }
53      }
54  }
```

VARIABLE PITCH INDENTATION IN SOURCE CODE FORMATTING

BACKGROUND—FIELD OF INVENTION

This invention relates to formatting of computer source code.

BACKGROUND—DEFINITIONS AND RELATED DISCUSSION

Block. (1) As a noun, code which is considered a logical unit as defined by the syntax of a computer language, usually delineated with block delimiters. (2) As a verb, to halt something, such as output, usually temporarily.

Block delimiters. Words or symbols which define the start and end of a block of code. In the C-language, block delimiters are curly braces, that is, {and}. FIGS. 1 through 9 and listings 11 through 22 provide examples.

Conditional statement. A statement which directs that if something, called the protasis, is true, then something, called the apodosis, should be done. An example of such a statement in the C-language has the form if (protasis) apodosis where the apodosis is a C-language statement. In computer languages, this basic concept is given a variety of expressions, as those skilled in the art will know. Usually the apodosis may, among other things, be a block of code.

Indentation. (1) The space in a display between the margin and the first visible character of the line; (2) the measure of such a space. Indentation is sometimes measured as an integral number of character positions. The indentation of a line is considered to have and be some number of pitches, that number being identical to the indentation level of the line. The indentation of a line is equal to the sum of the pitches which comprise the indentation.

Indentation indicator. For a line, anything that specifies an indentation. A commonly-used indentation indicator for a line is a sequence of zero or more tab and space characters at the start of the line. Displaying text whose indentation indicators cause tab stop use on a device having tab stops different than those assumed by a formatter may produce undesirable alignment. For this reason, some formatters offer the option of generating indentation indicators which do not cause tab stop use. A commonly-used indentation indicator which does not cause tab stop use is zero or more space characters at the start of the line.

Indentation level. The indentation of a line measured as a number of pitches: the Nth indentation level has N−1 pitches. Indentation level is a pure number, not a distance. An indentation level has an indentation. The indentation of the Nth level is the sum of the first N−1 pitches. An indentation level has a pitch. The pitch of the Nth indentation level is the Nth pitch. Note that the pitch of an indentation level is not included in the indentation of the level.

Nesting. Generally, the apodosis of any conditional statement may itself contain a conditional statement or a block, and generally, blocks may contain blocks and conditional statements. This sort of containment can occur to many levels and is referred to as nesting. FIGS. 1 through 9 all show nested conditional statements and nested blocks, as do listings 11, 12, and 22. When one item is nested inside another, the inner item is considered to have the greater nesting level.

Nesting level. The overall nesting level, considering all of the constructs of a computer language that can nest. Nesting level is a pure number. A nesting level has an indentation level. The first indentation level is not necessarily the first nesting level, and there may be one or more indentation levels intermediate between nesting levels. The pitch of a nesting level is its nesting pitch, which may be greater than the pitch of its indentation level. The indentation of a nesting level is the indentation of its indentation level.

Nesting pitch. (1) The distance from one nesting level to the next greater nesting level, that is, the difference obtained by subtracting the indentation of one nesting level from the indentation of the next larger nesting level; (2) the measure of such a distance. When fixed-pitch fonts are used in the display, nesting pitch is normally measured as an integral number of character positions.

Pitch. (1) The distance between one indentation and the next larger indentation, that is, the closest actual or anticipated distance in the surface of a display between two parallel straight lines in the surface of the display, one line passing through the start of two source code lines having the same indentation, and the other line passing through the start of a source code line having the next larger indentation; (2) the measure of such a distance. When fixed-pitch fonts are used in the display, pitch is normally measured as an integral number of character positions.

BACKGROUND—DESCRIPTION OF PRIOR ART

There is a class of computer system functionality which includes, among other things, the indenting of lines of source code in accordance with nesting levels found in the text, and doing so regardless of the indentation of the text prior to formatting. Systems having this functionality are able to parse the text and detect therein the nesting levels needed to assign proper indentation. This functionality is sometimes referred to as beautification, sometimes as indenting, and sometimes merely as formatting. This functionality is found in stand-alone programs which have this functionality as their primary operation. It is also found in programs whose primary function is not formatting, such as, for example, in some text editors.

It is customary when formatting source code to give most lines which have the same nesting level the same indentation. There can, however, be exceptions to this rule. A notable exceptions to this general rule are block delimiters. Block delimiters, being boundaries, may be considered to be inside or outside of the block they delimit, or to not be part of any block. Some formatters offer the option, for example, of aligning block delimiters midway between nesting levels. Other common exceptions to the general rule are comments, compiler directives, and definitions, all of which may be given indentations which are not those of any nesting level.

It is customary to indent a line according to the nesting level of the first displayable character on the line, with some exceptions. Labels are perhaps the most notable of the exceptions, where it is often preferable to place the label toward the beginning of the line and then indent the rest of the line as if the label were not part of the line, space permitting.

Code is frequently presented to readers in printed form or on a computer display device. Such presentation media have limited widths, and long lines must either be wrapped, as in FIG. 1, or clipped, as in FIG. 2. Wrapping and clipping reduce the amount of information a page or screen displays at one time. A method of indentation which increased the amount of code shown without sacrificing clarity would be an improvement.

Current formatting systems yield fixed-pitch nesting levels when the code is displayed with the fixed-pitch tab-stop settings assumed by the formatter. Of course, code whose indentation indicators include tab characters may align so that the nesting pitches are not all the same when the display device has unevenly spaced tab stops. And code whose indentation indicators include both tab and space characters may do this when the display tab stop settings are different from those assumed by the formatter, even when evenly spaced.

Current formatting systems do not provide an option to specify a maximum indentation which is distinct from a maximum line length.

There are text formatters which align portions of text at other than a fixed pitch from one indentation to the next larger indentation. But these text formatters do not indent computer source code as described above.

SUMMARY OF THE INVENTION

The present invention deals with, and is an improvement to, the internal workings of a provided system which indents lines of source code according to the nesting levels of the lines. The fundamental improvement is to yield for the provided formatter indentation level pitches which are not all the same. There are three manifestations.

Manifestation one is an improvement to source code formatting which provides multiple-pitch indentation, that is, indentation wherein not all nesting levels have the same pitch. FIGS. 3a, 3b, 4b, and 9 illustrate this manifestation.

Manifestation two is an improvement to source code formatting which provides changeable-pitch indentation, that is, indentation wherein the pitch of the same indentation level may be different in different lines of code. FIGS. 8 and 9 illustrate this manifestation.

Manifestation three is an improvement to source code formatting which for some class of lines yields pitches for indentation levels such that no line in the class has an indentation greater than a maximum. FIGS. 4a, 5, 6, and 7 illustrate this manifestation.

OBJECTS AND ADVANTAGES

It is an object of the invention to present more source code on a given formatted line, with the advantages that fewer lines of text will have to be wrapped or clipped when displayed or printed, and more lines of text can be printed on a page or shown at one time on a display device. It is a further object and advantage of multiple-pitch indentation to improve clarity of source code presentation by placing larger nesting pitches where they will assist the reader the most.

The foregoing and other objects, features, and advantages of the invention will become more readily apparent from the following detailed description.

BRIEF DESCRIPTION AND DISCUSSION OF FIGURES

The source code within each of the figures is in the C-language. All figures are discussed from the point of view that an indentation pitch of 8 spaces is the most desirable. This point of view is adopted for purposes of illustration only.

FIG. 1 shows computer source code formatted with fixed-pitch indentation with long lines wrapped around from the right margin to the left margin. This figure illustrates that wrapping of long lines increases the number of lines needed to lay a given amount of code.

FIG. 2 shows computer source code formatted with fixed-pitch indentation with long lines clipped at the right margin. This figure illustrates, in comparison with other FIGS. 1 through 7, this obvious fact: clipping of long lines means that some portion of each clipped line is not displayed.

FIG. 3a shows computer source code formatted with multiple-pitch indentation, two nesting levels per nesting pitch. This figure illustrates, in comparison with FIGS. 1 and 2, that using multiple-pitch indentation enables the presentation of more source code in a given number of lines of a given width than is generally the case with fixed-pitch indentation.

FIGS. 3b shows computer source code formatted with multiple-pitch indentation, using leading nesting pitches and two nesting levels per nesting pitch thereafter.

FIG. 4a shows computer source code formatted with fixed-pitch indentation and a maximum indentation. Note the loss of clarity for those indentation levels which are all aligned at the maximum. Nevertheless, none of the lines are wrapped or clipped in this instance, so at least the information is present, and in the fewest number of lines that could be required. This figure shows the effect of trading clarity for compactness of display, that is, preferring to have more code in the display at the expense of clarity.

FIG. 4b shows computer source code formatted with multiple-pitch indentation and a maximum indentation. The initial pitch, 8, and the number of levels at a pitch, 1, has been chosen so that for the source code in the figure, the maximum indent is never reached. This figure shows that by selecting the right initial pitch, and the right number of nesting levels at a pitch, it may be possible to avoid the extreme degradation of clarity that a maximum indent may cause, yet obtain similar benefits.

FIG. 5 illustrates zig-zag indentation for indentation levels beyond the maximum.

FIG. 6 illustrates oscillating indentation for indentation levels beyond the maximum, and the marking of indentation levels beyond the maximum.

FIG. 7 illustrates saw-tooth indentation for indentation levels beyond the maximum.

FIG. 8 shows computer source code formatted with changeable-pitch indentation in conjunction with fixed-pitch indentation. This figure illustrates that by reducing pitch sizes for more deeply indented sections of code, more code can be displayed than if pitches were not reduced.

FIG. 9 shows computer source code formatted with changeable-pitch indentation in conjunction with multiple-pitch indentation. This figure illustrates that by reducing pitch sizes for more deeply indented sections of code, more code can be displayed than if pitches were not reduced.

DETAILED DESCRIPTION AND PREFERRED EMBODIMENT OF THE INVENTION

There are two objectives to be balanced in determining the preferred embodiment of the invention: one, increasing the amount of source code shown on a page or screen or other media, and two, maintaining or increasing clarity of presentation. Based on experimentation, a good result is produced by using non-increasing nesting pitches which are not all the same, and, when a maximum indentation is used, aligning at the maximum all lines whose indentation exceeds the maximum. Both of these are offered in the preferred embodiment, and are illustrated in FIGS. 3a and 4a. Also, since some users may wish to specify explicitly the pitch of one or more of the leading nesting levels, as illustrated in FIG. 3b, the preferred embodiment offers this capability as well. Finally, some users may wish to compact deeply indented sections of code more tightly than less deeply indented sections, so the preferred embodiment offers the capability to adjust the pitch of the indentation levels, as illustrated in FIGS. 8 and 9.

The preferred embodiment, then, with all options included, provides for the following: user-specified pitches for leading nesting levels, and differently-sized, non-increasing, nesting pitches for all remaining nesting levels. In addition, it offers the ability to temporarily reduce pitches of indentation levels, and to apply the reduced pitches to deeply-indented sections of code. Finally, it offers the ability to enforce a maximum indentation for one or more classes of lines.

By allowing the user to specify the pitch of zero or more leading nesting levels, the user may place the larger pitches in the most advantageous place for special cases. In cases where the user does not specify pitches for leading levels, then using differently-sized non-increasing nesting pitches places the larger nesting pitches at the start of the line. And this is where they are normally needed most in source code since it is toward the start of the line that lines at the same indentation level will be separated by the most intervening lines of greater indentation. The larger indentation pitches toward the start of the line will make it easier for the eye to see at a glance what lines are aligned at the same indentation level. On the other hand, the further from the start of the line one goes, the fewer are the lines of yet greater indentation which come between lines indented at the same depth, so the eye does not need so great an indentation from one level to the next to be able to see the proper alignment at a glance.

It is best for clarity to not use a maximum indentation, but when the balance between clarity and amount of source code displayed is tipped toward more text with a sacrifice of some clarity, then experimentation has shown zig-zag (FIG. 5), oscillating (FIG. 6), and saw-tooth (FIG. 7) indentation less clear for most source code than simply aligning at the maximum indentation all lines of a class which would otherwise be indented beyond the maximum (FIG. 5).

By providing the option to temporarily decrease the size of pitches for deeply indented sections of code, it is possible to reduce the number of wrapped, clipped, or maximally indented lines, with a minimum loss of clarity, as illustrated in FIGS. 8 and 9.

It is also possible to reduce the number of maximally indented lines by employing multiple-pitch indentation as illustrated in FIG. 4b, as contrasted with 4a.

Preferred Embodiment and Implementation of Manifestation 1, Multiple-pitch Indentation Multiple-pitch indentation is an improvement to source code formatting which generates nesting pitches for nesting levels such that not every nesting level has the same nesting pitch.

Multiple-pitch indentation may be implemented in more than one way. It would be possible, for example, to maintain nesting level information in an array of storage structures, a group of arrays, or a linked list of storage structures. These arrays or structures could be initialized at start-up with indentation information, or filled on-the-fly as needed. Information from them could be associated with a line by copying indentation information from them to the line's own private copy. Alternatively, it would be possible to make the association by keeping for each line either an index into the arrays, or a pointer to an element of the linked list, and accessing the indentation information by using the pointer or index.

As regards the matter of how many consecutive nesting levels are to be given the same nesting pitch, there are several reasonable options. It would be possible to signal the need to change pitch when the total indentation accumulated at a given pitch size exceeds some value, such as, for example, 20 character positions. It would also be possible to signal the need to change pitch when the total indentation from the margin reaches one of a number of milestones, such as, for example, 25, 50, and 75 spaces from the margin.

As for the amount a nesting pitch should change, there are also many reasonable options. It would be possible to decrease or to increase the pitch at any change, and by any amount, even negative amounts. It would also be possible to decrease the pitch by some amount for some number of nesting levels, and then increase the pitch by some amount for some number of nesting levels, and to repeat this process, decreasing and increasing, for any number of levels.

Each of these issues has been considered and decided upon for the preferred embodiment. In the preferred embodiment, the user is given the option of specifying as many leading nesting pitches as desired, and the first nesting pitch for all remaining nesting levels. In the preferred embodiment, the user is also given the option of whether the remaining pitches should all be the same or not. If they are not to be all the same, then whenever the nesting pitch is changed due to multiple-pitch indentation, it is decreased, and the amount of decrease is one character position, and the number of nesting levels which are given each of these pitches is the same until the minimum nesting pitch is reached.

In the implementation, user-specified leading nesting pitches and the first nesting pitch for all remaining levels are stored in an array. And in the implementation of the preferred embodiment, the indentation and nesting pitch of the current nesting level are stored in global variables accessible to both the implementation and the supplied formatter. The formatter tells the implementation when it wishes to increment or decrement the current nesting level by way of function calls. And the supplied formatter stores a line's indentation with other information maintained about each line.

Multiple-pitch indentation may be implemented by maintaining in RAM storage the following items, and using them to obtain the proper indentation and nesting pitch for any nesting level. The listings referred to are listings 11 and 12.

The following two global storage value are used by the formatter, the one in which the preferred embodiment has already been implemented, to properly indent the lines of source code:

a current-nest-indent, called NestIndentation in the listings, and a current-nest-pitch, called NestPitch in the listings.

The following three storage values are used to implement the user-specified list of leading nesting pitches:

a current-nest-level, called NestLevel in the listings, and a count-of-leading-pitches, called NoOfLeadingPitches in the listings and an array-of-leading-pitches, called ListOfPitches in the listings.

The following two storage values are used to prevent the nesting pitch at a level from going below some minimum pitch:

a smallest-pitch-allowed, called SmallestPitchAllowd in the listings, and a theoretical-nest-pitch, called TheoreticalNestPitch in the listings.

The following two storage values are used to provide a signal of when to change the nesting pitch (maximum-levels-at-a-pitch is a modulus, current-levels-at-a-pitch is a counter):

- a maximum-levels-at-a-pitch, called MaxLevelsAtPitch in the listings, and
- a current-levels-at-a-pitch, called LevelsAtPitch in the listings.

In the implementation of the preferred embodiment, when increasing the nesting level, the indentation is increased by the nesting pitch of the current nesting level. Note, therefore, that when decreasing the nesting level, the indentation must be decreased by the nesting pitch of the next lower nesting level, not the pitch of the current nesting level.

The preferred embodiment provides for an optional user-specified list of leading nesting pitches. Therefore, whenever seeking to determine the nesting pitch at a nesting level, it must be determined whether the level whose pitch is sought is specified by the list or not. If it is, the level is obtained from the list.

In the implementation of the preferred embodiment, it is a user option whether the remaining nesting pitches, those not specified by the list, will all be the same or not. If they are not to all be the same, then some way must be maintained to signal the need to change the pitch. A counter is used for this, as is a modulus for the counter. The modulus is the number of nesting levels that will have the same nesting pitch until the smallest allowed nesting pitch is reached. In FIG. 4b the modulus is 1 and the minimum pitch is 1 and the minimum pitch is reached. If the modulus is zero, then all nesting pitches after those specified in the list of leading pitches are to be the same.

The following paragraphs explain the operation of listing 11.

In this implementation, when logical relationships in the source code direct that the nesting level increase, then the current-nest-indent is increased by the current-nest-pitch. Then the current-nest-level is incremented. Then, one of two cases is true: either the current-nest-level is greater than the count-of-leading-pitches, or it is equal to or less than the count-of-leading-pitches. If the current-nest-level is equal to or less than the count-of-leading-pitches, then the current-nest-pitch is obtained from the array-of-leading-pitches, and we are finished here. If the current-nest-level is greater than the count-of-leading-pitches, then if the maximum-levels-at-a-pitch is zero, we are finished here. Otherwise, the current-levels-at-a-pitch is incremented. If after incrementing, the current-levels-at-a-pitch is equal to the maximum-levels-at-a-pitch (this is the signal to decrease pitch), then the current-levels-at-a-pitch is set to zero and the theoretical-nest-pitch is decremented. If the theoretical-nest-pitch is greater than or equal to the smallest-pitch-allowed, the current-nest-pitch is set equal to the just-decremented theoretical-nest-pitch. Whenever finished here, the proper indentation is in the current-nest-indent and the nesting pitch of the current (new) nesting level is in the current-nest-pitch.

The following paragraph explain the operation of listing 12.

When the logical relationships in the source code being formatted direct that the nesting level decrease, then the current-nest-level is decremented. Then one of two cases is true: either the current-nest-level is less than the count-of-leading-pitches, or it is equal to or greater than the count-of-leading-pitches. If the current-nest-level is less than the count-of-leading-pitches, then the current-nest-pitch is obtained from the array-of-leading-pitches, and then skip down to stars. If the current-nest-level is equal to or greater than the count-of-leading-pitches, then if the maximum-levels-at-a-pitch is zero, then skip down to stars. Otherwise, if the current-levels-at-a-pitch is zero (this is the signal to increase pitch), then the current-levels-at-a-pitch is set to the maximum-levels-at-a-pitch, and the theoretical-nest-pitch is incremented, and if the just incremented theoretical-nest-pitch is greater than or equal to the smallest-pitch-allowed, then the current-nest-pitch is set to the just incremented theoretical-nest-pitch. Next, the current-levels-at-a-pitch is decremented. ******* Finally, the current-nest-indent is decreased by the (new) current-nest-pitch. When finished here, the proper indentation is in the current-nest-indent and the nesting pitch of the current (new) nesting level is in the current-nest-pitch.

Note the following for this implementation of the preferred embodiment of multiple-pitch indentation:

The array-of-leading-pitches is stored in RAM memory and is composed of zero or more leading nesting pitches followed immediately in the same array by the first nesting pitch to be used after the leading nesting pitches are exhausted. This array always has at least one element.

The count-of-leading-pitches is stored in RAM memory as negative one if the actual count is zero.

The current-nest-indent, the current-nest-level, and the current-levels-at-a-pitch start at zero at the beginning of each file run.

The current-nest-pitch starts as the first value in the array-of-leading-pitches at the beginning of each file run; the theoretical-nest-pitch starts as the last value in the array-of-leading-pitches at the beginning of each file run. If there are no leading nesting pitches, these will be from the same array element.

The maximum-levels-at-a-pitch and the smallest-pitch-allowed are set by the user or by default.

The condition for obtaining the current-nest-pitch from the array-of-leading-pitches, or rather, for not doing so, is slightly different when going to a greater nesting level than when going to a lesser one. This slight difference is important to maintaining correct values in the theoretical-nest-pitch and the current-levels-at-a-pitch. The comparison used when going to a greater nesting level is what necessitates setting the count-of-leading-pitches to negative one rather than zero when the number of leading pitches is zero.

In the implementation just described, after any leading nesting pitches are used, nesting pitches are generated which are non-increasing as the nesting level increases, and which, if the maximum-levels-at-a-pitch is non-zero, decrease to the smallest-pitch-allowed.

Preferred Embodiment and Implementation of Manifestation 2. Changeable-pitch Indentation Changeable-pitch indentation is an improvement to source code formatting which gives some indentation levels different pitches for different lines.

Changeable pitch indentation may be implemented in more than one way. It would be possible to designate that only certain indentation levels are to be eligible for changing, such as all levels greater than the third, say, or every other level beginning with level two. In the preferred embodiment, all levels may be changed. It would also be possible to change levels by making them larger, or by making some larger and some smaller. In the preferred embodiment, levels which are changed are only made smaller. And there is scarcely any limit to the algorithms which might be implemented to choose which of the eligible levels to change, and by how much. In the preferred embodiment, the algorithm used is: select the most-indented level among those levels having the largest pitch, reduce it by one space, and repeat this process as much as is necessary and possible to achieve the desired change. Again, it would be possible to store a line's indentation level, as opposed to tentative indentation, block output to collect a group of lines, determine the deepest indentation level among the lines, decide the pitch of the several levels, and apply the pitches in generating the indentation for each line in the group. But for reasons special to the formatter in which the preferred embodiment is implemented, indentation levels are not stored, but tentative indentations instead. Then, when a group of lines has been collected, the tentative indentations are used to produce an array in which all the indentation levels used are evident, as are the pitches of all but the largest level, and in particular, all the pitches comprising the indentation of the most deeply-indented line in the group. Then the pitches are changed in size in the array to meet some objective, and the new pitches used to determine new indentations for the lines of the group. There is a common method in both procedures described in this paragraph, however, and this common method expresses the components of the preferred embodiment of changeable-pitch indentation. The method has the following components:

(a) for some group of lines (b) identify all indentation levels used in the group of lines (c) decide the size of the pitch of each indentation level, usually with some goal in mind, such as to indent all lines of the group no more than some maximum indentation, or so that no line in the group extends beyond some desired maximum line length, or to have some preferred sequence of pitches (d) apply the pitches in calculating the indentation of each line in the group, that is, for each line in the group, determine the indentation using the decided pitch sizes, and report the indentation to the provided formatter.

Note that the preferred embodiment operates on more than just nesting pitches.

The preferred embodiment does not depend on a specific method of defining or collecting the group of lines, but the implementation of the preferred embodiment described herein does include rules for defining a group, and does show a collection method. How the group of lines should be defined and collected is dependent on the computer language of the code being formatted and on the implementation of the formatter. Also, the preferred embodiment does not specify criteria to be used to determine what the size of the several pitches should be, but the implementation shown here includes a criterion.

Note that it would be possible to use the basic method of changeable-pitch indentation to implement manifestation one of the invention, multiple-pitch indentation, by simply making the group consist of every line in the file.

It would also be possible to use the basic method of changeable-pitch indentation to implement manifestation three of the invention, maximum indentation, by simply noting for each line whether its indentation was greater than the maximum for the class of the line and reporting the maximum in cases when it was greater.

The preferred embodiment of changeable-pitch indentation may be implemented by maintaining in RAM storage the following, and using these in the processes described below to change the indentation provisionally assigned to the affected lines:

a start line info block, called StartLineInfo in listings 21 and 22, and an end line info block, called CurrentLine in listings 21 and 22, and a desired max indent, called DesiredMaxIndent in listing 22, and a minimum pitch, called MinPitch in listing 22.

During start-up of the formatter, the desired max indent and the minimum pitch are set according to user specifications by well-known methods. Then, to the normal process of formatting, the following additional processes are added: (A) each time the indentation level of output lines increases from the first indentation level to the second indentation level, that is from no indentation to some indentation, the start line info block is filled with line information for the line at the second indentation level, and output of this and subsequent formatted lines is blocked; and (B) when the next output line whose indentation will be at the first indentation level is encountered, or the end of the file, whichever is first, the end line info block is filled with line information for the line. At this point, the start line info block and the end line info block define a sequence of output lines, none of which has been output. This sequence is the provided group of lines. At this point some or all of steps 1 through 7 are done, each of which corresponds to the same-numbered step in listing 22. A description of steps 1 through 7 follows.

Identify all the indentation levels used in the group of lines: steps 1 to 3.

In step 1, a determination is made of the greatest indentation among the lines in the sequence of output lines. This is done by setting to zero a storage value, called LargestCodeIndent in listing 22. Then, examining each line in turn, if the line has a greater indentation than the current setting of the storage value, set the storage value to the greater indentation value. Also in this step, after the greatest indentation among the lines is determined, a comparison is made between it and the desired max indent. If the greatest indentation is less than or equal to the desired max indent, skip steps 2 through 6 and go to step 7.

In step 2, space is allocated for an array of integers. This array is made large enough to hold a number of elements equal to one more than the greatest indentation, counted in spaces, among the lines in the sequence, one integer in the array per space in the greatest indentation. In other words, the number of spaces in the greatest indentation determined in step 1, as a value, can be an index into the array. Also in this step, each element of the array is set to zero.

In step 3, the value one is placed in some of the elements of the array as follows. Now as actually implemented, and at the time this procedure is used by the formatter, the total indentation of each of the lines in question is the sum of more than one value, two of which may need adjustment. Therefore, up to two elements of the array are set for each line in the sequence of lines: the first of the two values is used as an index into the array and that element is set to one, then the sum of the first and second values is used as an index into the array and that element is set to one.

Decide the size of the pitch of each indentation level: step 4.

In step 4, the value two is placed in some of the elements of the array as follows. Determine the longest sequence of array elements which all have a value of zero, and if two or more such sequences are the same size, select that sequence which includes the largest array index among the sequences. If the number of array elements in the sequence is greater than or equal to the minimum pitch, select the element in the selected sequence with the largest index, and set the value of that element to two. Repeat this process until there is no sequence of zero-valued elements as large as or larger than the minimum pitch, or until a sufficient number of elements have been set to two so that the sum of the elements whose values are either zero or one is equal to the desired max indent. Each element in the array which is assigned a value of two corresponds to a space which will be removed from the pitch of some indentation level.

Apply the pitches: steps 5 to 6.

In step 5, examine in turn each element of the array, from the first element to the last, and maintain a running total of the number of elements whose value is two; at the same time, replace the value of each element whose value is one with the current value of the running total.

In step 6, replace the old indentation of each line in the sequence with the new indentation. As stated above, the total indentation of each of the lines in the sequence of lines is, at the time this procedure is used, a sum of more than one value, two of which are important here. Each of the two values is adjusted as follows. The second value is reduced by a number; that number is itself a difference produced by subtracting the value of two array elements: the content of the array element whose index is the first value is subtracted from the content of the array element whose index is the sum of the first and second values. The first value is reduced by a number; that number is the content of the array element whose index is the first value.

In step 7, unblock the writing of the lines in the sequence of lines, that is, allow the lines in the sequence to be written.

Preferred Embodiment and Implementation of Manifestation 3, Maximum Indentation Maximum indentation is an improvement to source code formatting which yields indentation pitches for a class of lines whereby the indentation of the line does not exceed some maximum indentation. In the preferred embodiment, all lines which would in the absence of the maximum be indented beyond the maximum are aligned at the maximum. This makes it possible in the implementation to adjust pitches wholesale, by the convenient device of substituting with the maximum those indentations which are in excess of the maximum.

The preferred embodiment of maximum indentation may be implemented in more than one way. One could notice at output time the start of a line, and maintain a total of the number and effect of the leading tabs and spaces, supposing the indentation indicator to be comprised of leading tabs and spaces. Then, when the desired maximum is about to be exceeded, make needed adjustments and skip the output of more tabs and spaces until some other character is output. If, however, the amount of indentation for a line is known at some point prior to writing the first character of the line, that point may be an opportune time to replace with a maximum any indentation which is in excess of that maximum. This latter approach is that of the implementation of the preferred embodiment.

The preferred embodiment provides for a separate maximum for one or more classes of lines. The implementation maintains in RAM storage a separate maximum indent amount for each class of text. The provided formatter determines the tentative final indentation of each class of line separately, and at that time, compares the indentation with the class maximum and replaces the indentation with the class maximum if it is less than the indentation.

The implementation of the preferred embodiment has a pleasant corollary benefit. It is possible to note the distance between the margin and an item which is not at the start of the line, such as a comment which follows code on a line. It is further possible to apply the same maximum indentation amount to the item, whereby the item is positioned at no greater distance from the margin than the maximum. This is especially beneficial for comments, for it allows line-ending comments to be conveniently aligned with line-starting comments in some frequently-occurring cases.

Operation of the Preferred Embodiment of the Invention

In the preferred embodiment, source code text is parsed into lines by the supplied formatter. In the formatter, each line in its turn is at some stage considered the line of current focus for the purpose of assigning to it a provisional indentation. For each line that the formatter considers to have a nesting level, it obtains the provisional indentation for that level from a global storage value which contains the indentation of the current nesting level. The formatter keeps the value in the global storage current by telling the implementation when it is increasing and when it is decreasing the nesting level. In response, the implementation changes the indentation in the global storage value by the appropriate nesting pitch and also stores the new current nesting pitch in a global storage location accessible to the formatter.

If the formatter is directed to adjust pitch sizes in an attempt, say, to prevent any line from indenting beyond a maximum indentation, then the formatter collects a group of lines in the form of a list of line information blocks, and passes pointers to the start and end of the list to the changeable-pitch indentation implementation. The implementation modifies the provisional indentations of the lines in the group by modifying a value or values in the information blocks of the lines of the group. The line indentations decided in this process are also provisional.

Finally, if the formatter is directed to respect a maximum indentation for any class of lines, then when, during processing lines of that class, the final provisional indentation of a line is known, it is compared with the class maximum and the maximum is substituted for the provisional indentation if it is less than the provisional indentation.

Summary, Ramifications, and Scope

The present invention is an improvement to the way lines of code are indented by a source code formatter. The invention deals with pitches, indentation levels, indentations, nesting pitches, and nesting levels, all of which are represented and manipulated as single values or combinations of values stored in machine registers, memory, or other devices. The invention need not deal with indentation indicators, although an implementation could be constructed which did deal with them.

The reader will see that by the use of different pitches for different nesting levels, and by use of different pitches for the same indentation level in different sections of the code, and by the use of one or more maximum indentations, it is possible to increase the amount of source code that can be presented in a given number of lines of a specified width. In addition, clarity of presentation can be largely preserved or even enhanced by the use of nesting levels whose pitches are not all the same.

Although the description above contains many specificities, these should not be construed as limiting the scope of the invention but as merely providing illustrations of some of the presently preferred embodiments of this invention. For example, more than one user-provided leading nesting pitch sequences might be used, each for a different class of text, such as one for comments, one for compiler directives, and one for definitions. As another example, the description almost always assumes fixed pitch fonts, equally spaced tab stops, and simple text storage files, but maximum indentation, multiple-pitch indentation, and changeable-pitch indentation are all possible to achieve with variable-pitch fonts, unequally-spaced tab stops and complex storage files.

Thus the scope of the invention should be determined by the appended claims and their legal equivalents, rather than by the examples given.

I claim:

1. In a system having a memory device and a stored program, wherein the stored program analyzes computer source code and assigns indentation indicators to output lines of said source code based in part on the nesting level of the lines as determined by the syntax and usage of the computer language of said source code, an improvement to the system comprising:

(a) machine storage for a maximum indentation amount for one or more classes of lines, and (b) means for replacing with a value the indentation of a line whose indentation is greater than said value, said value being said maximum indentation amount for the class of said line, whereby no line in the output has an indentation greater than the maximum for the class of the line.

2. In a system having a memory device and a stored program, wherein the stored program analyzes computer source code and assigns indentation indicators to output lines of said source code based in part on the nesting level of the lines as determined by the syntax and usage of the computer language of said source code, an improvement to the system comprising:

(a) identifying means for identifying indentation levels whose pitch is to differ from the pitch of the next lower indentation level, and (b) specifying means for specifying the same pitch for both of every two consecutive indentation levels except when the greater of the two levels is identified by said identifying means as a level whose pitch is to differ.

3. The improvement of claim 2 further including machine storage for a set of indentation level pitches, and wherein said specifying means specifies each pitch in said set as the pitch of one or more indentation levels.

4. The improvement of claim 3 wherein for indentation levels whose pitch is not specified by said set of pitches, the pitch specified by said specifying means for every indentation level identified by said identifying means is smaller than the pitch specified for the next smaller indentation level; whereby a non-increasing sequence of pitches is produced which are not all the same amount.

5. The improvement of claim 4 further including machine storage for a minimum pitch, and wherein for indentation levels whose pitch is not specified by said set of pitches, said identifying means identifies indentation levels such that the difference between any two successive identified levels is the same; whereby the number of indentation levels having the same pitch is the same until said minimum pitch is reached, after which all remaining indentation levels are given said minimum pitch.

6. The improvement of claim 4 further including machine storage for a minimum pitch, and wherein for indentation levels whose pitch is not specified by said set of pitches, said identifying means identifies indentation levels such that the difference between the indentation of any two successive identified levels is approximately the same; whereby the products produced by multiplying the size of a pitch by the number of indentation levels having said pitch is approximately the same until said minimum pitch is reached, after which all remaining indentation levels are given said minimum pitch.

7. The improvement of claim 4 further including machine storage for a set of levels and wherein for all indentation levels whose pitch is not specified by said set of pitches, said identifying means identifies indentation levels specified by members of said set of levels.

8. The improvement of claim 2 wherein the pitch specified by said specifying means for every indentation level identified by said identifying means is smaller than the pitch specified for the next smaller indentation level; whereby a non-increasing sequence of pitches is produced which are not all the same amount.

9. The improvement of claim 8 further including machine storage for a minimum pitch, and wherein said identifying means identifies indentation levels such that the difference between any two successive identified levels is the same; whereby the number of indentation levels having the same pitch is the same until said minimum pitch is reached, after which all remaining indentation levels are given said minimum pitch.

10. The improvement of claim 8 further including machine storage for a minimum pitch, and machine storage for a target value, and wherein said identifying means identifies indentation levels as a level which is to change when the sum of the pitches of at a given pitch amount first exceed said target value, whereby the total indentation of levels having the same pitch is approximately the same until said minimum pitch is reached, after which all remaining indentation levels are given said minimum pitch.

11. The improvement of claim 8 further including machine storage for a set of levels and wherein said identifying means identifies indentation levels specified by members of said set of levels.

12. In a system having a memory device and a stored program, wherein the stored program analyzes computer source code and assigns indentation indicators to output lines of said source code based in part on the nesting level of the lines as determined by the syntax and usage of the computer language of said source code, an improvement to the system comprising:

deciding means for deciding at runtime the pitch of indentation levels whereby the pitch assigned to at least one indentation level is not the same for all lines having said indentation level.

13. The improvement of claim 12 further including choosing means for choosing in turn two or more groups of consecutive lines, no group of which includes all lines of the code, said groups being each in turn a group of lines operated upon by said deciding means; whereby in the output of the system, the lines of text are divisible into distinct sequences, each of said sequences of lines having the same pitch at any given indentation level, and the sequences being distinguishable by there being for any two adjacent sequences at least one indentation level whose pitch is not the same in said adjacent sequences.

14. The improvement of claim 12 wherein said deciding means decides upon pitches so as to achieve as nearly as possible one of the following goals: (a) the maximum indentation of the most deeply indented line within the group does not exceed a predetermined maximum indentation, or (b) the longest line in the group does not exceed a predetermined maximum line length.

15. The improvement of claim 12 further including identifying means for identifying indentation levels whose tentative pitch is to differ from the pitch of the previous level, and wherein said deciding means specifies the same tentative pitch for both of every two consecutive levels except when the second level of the two is identified by said identifying means as a level whose tentative pitch is to differ.

16. In a system having a memory device and a stored program, wherein the stored program analyzes computer source code and assigns indentation indicators to output lines of said source code based in part on the nesting level of the lines as determined by the syntax and usage of the computer language of said source code, an improvement to the system comprising:

(a) storage for a provided set of values;

(b) reporting means for reporting to said system the pitch of some nesting levels using elements from said set of values.

17. In a system having a memory device and a stored program, wherein the stored program analyzes computer source code and assigns indentation indicators to output lines of said source code based in part on the nesting level of the lines as determined by the syntax and usage of the computer language of said source code, an improvement to the system comprising:

(a) storage for a provided list of n unique indentation amounts wherein the difference between any of the first $n-1$ amounts and the next larger amount are not all the same, and (b) reporting means for reporting to said system the indentation of some nesting levels using elements from said set of values.

* * * * *